United States Patent

[11] 3,626,273

[72] Inventors   Peter Pfeffer
                Lauffen;
                Edgar Kuhn, Gerlingen, both of Germany
[21] Appl. No.  38,378
[22] Filed      May 18, 1970
[45] Patented   Dec. 7, 1971
[73] Assignee   Robert Bosch GmbH
                Stuttgart, Germany
[32] Priority   May 23, 1969
[33]            Germany
[31]            P 19 26 317.3

[54] VOLTAGE REGULATOR ARRANGEMENT FOR PREVENTING OVERVOLTAGES
     9 Claims, 1 Drawing Fig.
[52] U.S. Cl. .................................................. 322/28,
                                    322/90, 322/91, 322/93
[51] Int. Cl. ............................................. H02p 9/00
[50] Field of Search .......................................... 322/28, 89,
                                    90, 91, 93; 320/71

[56]                References Cited
              UNITED STATES PATENTS
3,456,182   7/1969   Cummins et al. ..............   320/71 X
3,530,366   9/1970   Schwarm ......................   322/28

Primary Examiner—T. E. Lynch
Assistant Examiner—H. Huberfeld
Attorney—Michael S. Striker ABSTRACT: Two closely coupled output windings of an AC generator have a common point. A first and second thyristor are connected across the windings, the voltages across each having opposite polarity. When the load voltage drops below a predetermined value, control pulses are applied to the gates of both thyristors. Therefore, they fire in turn, causing a substantially uninterrupted short circuit across both windings because of the close magnetic coupling between the windings.

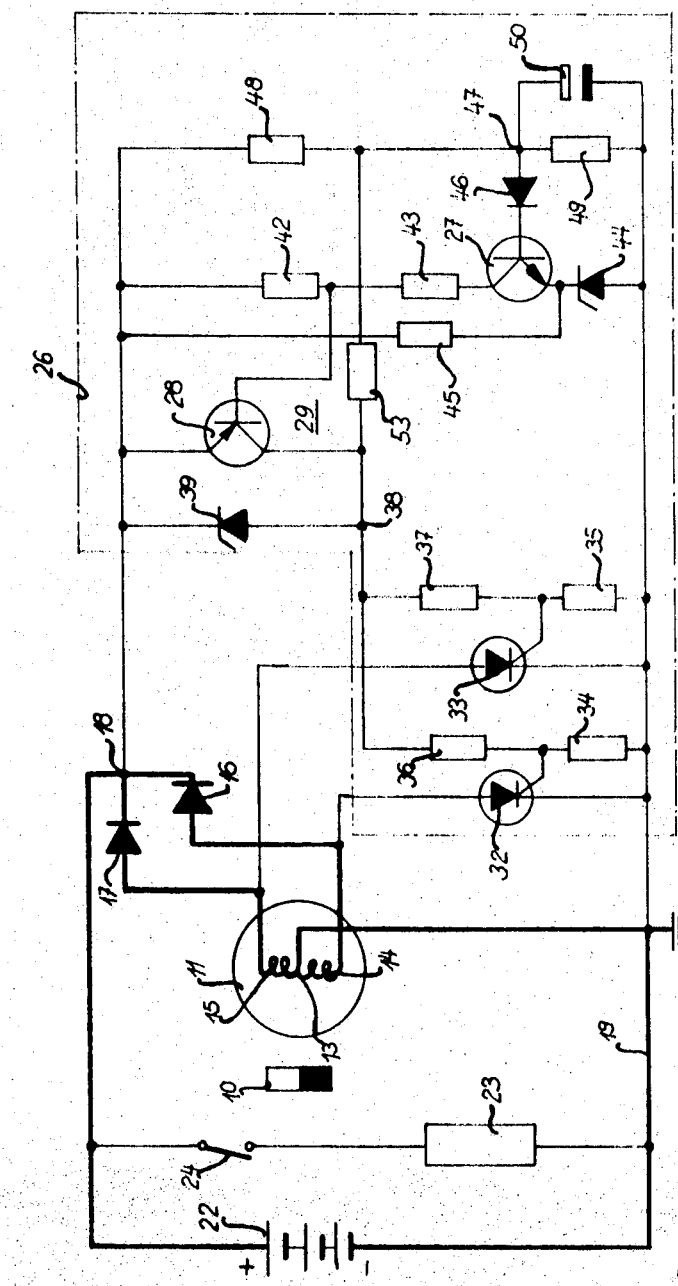
INVENTORS
Peter PFEFFER
Edgar KUHN
By
their ATTORNEY

VOLTAGE REGULATOR ARRANGEMENT FOR PREVENTING OVERVOLTAGES

BACKGROUND OF THE INVENTION

This invention relates to a voltage regulator for regulating the voltage across a direct current load when the voltage source is an alternating current generator whose output is rectified. In particular, it relates to such a regulator wherein said alternating current generator has an output winding winding and wherein switching means are connected in parallel to said output winding, said switching means being controlled in such a manner that they become conductive when the voltage across the direct current load exceeds a predetermined voltage.

In particular, this invention relates to such a voltage regulator when used in conjunction with a permanent magnet type of alternating current generator. In known voltage regulator arrangements of this type, the series combination of a transistor, a resistance and a diode is connected in parallel with one output winding of the permanent magnet generator when the load voltage exceeds a predetermined voltage. In this manner, the alternating voltage at this output winding is reduced only over one-half wave, but not over the other half wave. Thus during operation, high voltage peaks can appear across the direct current load when no battery is connected in circuit. For a generator having a 12-volt nominal voltage, these voltage peaks may reach over 200 volts and are therefore very dangerous, particularly since in such nominally low voltage arrangements, no such high voltages are expected.

However, it has been shown that particularly in the area in which such permanent magnet generators are used, namely in simple equipment as for example construction machines, motorcycles, snow scooters, etc., it often happens that the battery is removed for a period of time, for example to start another engine. Thus accidents can result if the operator, after having removed the battery, touches the battery-connecting cables, since these cables as mentioned above can reach dangerously high voltages when the known-type voltage regulator arrangements are used.

SUMMARY OF THE INVENTION

It is an object of the present invention to limit the output voltages across a direct current load, in an arrangement as described above, so that these voltages are limited even when the battery is removed.

This invention comprises a voltage regulator arrangement for regulating the load voltage across a direct current load. It comprises alternating current generating means having a first output winding and a second output winding magnetically coupled to said first output winding. Rectifier means are connected to said first and second output windings and furnish said load voltage between a first and a second rectifier output terminal. First switching means having a first control electrode and adapted to have a unidirectional conducting state in response to a control signal applied to said first control electrode, and second switching means having a second control electrode and adapted to have a unidirectional conducting state in response to a control signal applied to said second electrode are also furnished. Connecting means connect said first switching means across said first output winding and said second switching means across said second output winding in such a manner that a substantially continuous short circuit exists across said magnetically coupled output windings in response to control signals at said first and second control electrodes. Finally, control circuit means connected between said direct current load and said control electrodes furnish said control signals in dependence upon said load voltage.

The substantially uninterrupted circuit is obtained by using as switching means a first and second thyristor and by controlling said thyristors in such a manner that one short circuits the positive half wave, while the other short circuits the negative half wave. Because of the magnetic coupling between the windings short circuiting one of the windings, results in a short circuit of the other winding also. Thus the voltage is limited to a safe value.

In a particularly simple embodiment of the present invention, the control circuit means comprise a control switching transistor at the output. First and second voltage divider means, each having a voltage divider tap, may be connected to the emitter-collector circuit of said transistor. By such an arrangement, connecting the control electrodes of the thyristors to said voltage divider taps results in substantially equal current distribution for the ignition of each of the two thyristors. The safety of the arrangement may be increased even more, if an additional control element having a predetermined voltage breakdown characteristic, as for example a Zener diode, is connected in parallel with the emitter-collector circuit of said switching control transistor. In this case, any increase in load voltage over a predetermined voltage value causes this element to become conductive again causing ignition of the thyristors via the first and second voltage divider means which interconnect the gates of the thyristors and the emitter-collector circuit of the switching transistors.

If the output voltage increases very rapidly, for example because the battery has been removed, the Zener diode breakdown causes the thyristor to become activated almost instantaneously, thus limiting the output voltage before this can reach a dangerous value. This arrangement has proven itself greatly in practice, since here the voltages can be limited to a value which will in most cases produce no danger to the operator.

In A particularly simple embodiment of the present invention, a single-phase alternating current generator has first and second output windings which are connected at a common point. Parallel to each of these output windings is a thyristor, each of the thyristors having the corresponding electrode, for example both anodes, connected to said common point. Here a particularly simple connection to the control electrodes of the thyristors results and no pulse transformer is required.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a schematic circuit diagram of a control arrangement, in accordance with this invention.

DESCRIPTION OF THE PREFERRED EMBODIMENT

The single FIGURE shows a permanent magnet single-phase alternating current generator 11, utilizing permanent magnet 10. The alternating current generator has a first and second winding, 14 and 15, connected at a common point 13. This common point 13 is connected to ground, while the free end of windings 14 and 15 is connected, respectively, to the anode of a diode 16 and 17. Cathodes of diodes 16 and 17 are connected in common to the positive voltage line 18 connected to the positive terminal 22 of a battery which constitutes a part of the direct current load circuit. The other terminal of the battery is connected to ground. The battery may, for example, be a 12-volt battery. A direct current load 23, for example a headlight, an ignition circuit, etc., can be connected between positive line 18 and ground by means of a switch 24. It is obvious that the output windings 14 and 15 which are magnetically closely coupled to each other via the magnetic circuit of generator 11, constitute a single-phase center tap rectifier circuit when used in conjunction with diodes 16 and 17.

The voltage regulator circuit is denoted by 26. It comprises first and second switching means, in this embodiment thyristors 32 and 33, respectively, and control circuit means which are embodied in the remainder of block 26, excluding said thyristors.

Specifically, the control circuit means comprise a control switching transistor 28 which is operated as a switch and furnishes enough current for full ignition to thyristors 32 and 33 when in the conductive state. Transistor 28 is driven by a transistor 27 in such a manner that transistor 28 is switched "on," i.e. to the conductive state, when the load voltage exceeds a predetermined load voltage.

The voltage regulator circuit 26 is constructed as follows: The cathodes of thyristors 32 and 33 are connected to ground. The anode of thyristor 32 is connected to the anode of diode 16 and the free end of winding 14, while the anode of thyristor 33, in common with the anode of diode 17, is connected to the free end of output winding 15. The gates of thyristors 32 and 33 are, respectively, connected to ground via a resistance 34 and 35, for example 1,000 ohms each, and to a circuit point 38, the control circuit output terminal, via a resistor 36 and 37, for example 400 ohms. The collector of transistor 28 is also connected to the control circuit output terminal, namely terminal 38, while its emitter is connected to line 18. Connected in parallel with the emitter-collector circuit of transistor 28 is an additional control element, namely a Zener diode 39. Specifically, the anode of Zener diode 39 is connected to point 38.

The base of transistor 28 is connected to line 18 via a resistor 42 and to the collector of transistor 27 via a resistor 43. The emitter of transistor 27, an NPN-transistor, is directly connected to the cathode of a Zener diode 44 whose anode is connected to ground. It is further connected to line 18 via a resistor 45, for example 4 kΩ. The anode of Zener diode 44 is connected to ground, so that emitter of transistor 27 has a relatively constant potential relative to ground when the circuit is in operation. This voltage may, for example, be 8 volts. Third voltage divider means comprising a resistor 48 and 49 are connected from line 18 to ground. The common point of resistors 48 and 49 is called the control circuit input. The control circuit input is connected to the base of transistor 27 via a temperature compensating diode 46 whose anode is connected to the control circuit input, point 47, while its cathode is connected to the base of transistor 27. A capacitor 50 of, for example, 1.5 microthodes, is connected between point 47 and ground. Further, a resistor 53, positive feedback means, is connected between the collector of transistor 28 and point 47. Use of this resistor causes transistor 28 to act as a switch, that is, the transistor is either fully conductive or fully blocked, as will be described below.

OPERATION

In operation, generator 11 is driven by suitable driving means, for example by the engine of a snow scooter, that is it is driven with a variable speed. The load, too, is variable, for example it depends upon whether battery 22 is fully charged or fully discharged, and whether a load 23 is or is not in the circuit. Voltages are induced in output windings 14 and 15 which are rectified by diodes 16 an 17 and applied to battery 22 and, if it is in the circuit, load 23. Thus the voltage at battery 22 and thus the voltage between lines 18 and 19 will increase.

This increase in voltage results in a corresponding increase in the voltage between point 47 and ground. As long as this voltage is under approximately 9 volts, transistor 27 is blocked and in turn, blocks transistor 28 by blocking its base current. Therefore, the control electrodes of thyristors 32 and 33 also receive no current causing these thyristors to be blocked.

If the voltage between point 47 and ground rises above 9 volts, a base current flows in transistor 27 and this becomes conductive. Thus, the base current for transistor 28 can flow over the collector-emitter circuit of transistor 27 and transistor 28 also becomes conductive. This causes the voltage at the collector of transistor 28, namely the voltage at the control circuit output terminal, to increase. This change in potential again results in an increase at point 47 causing transistor 27 to become fully conductive, thus causing transistor 28 to become fully conductive also. This circuit operation takes place within a very short time. When transistor 28 is fully conductive, a control current is applied to the gates of thyristors 32 and 33 so that thyristor becomes conductive whose anode is, at that moment, positive with respect to its cathode. By arranging the interconnecting means between point 38 and the control electrodes to be two parallel paths comprising identical resistors, the control current for each of the thyristors will be substantially equal to the control current of the other, for example 30 milliampheres each.

If it is assumed that at first a positive voltage exists across thyristor 32, this thyristor becomes conductive and directly short circuits winding 14. Because of the close magnetic coupling between windings 14 and 15, this short circuit essentially short circuits winding 15 also.

If, after a half period of the applied voltage, the anode of thyristor 32 becomes negative and that of thyristor 33 becomes positive, the short circuit current is transferred to thyristor 33 so that this thyristor directly short circuits winding 15 and, because of the magnetic coupling, also short circuits winding 14. As long as transistor 28 remains conductive, both output windings of the alternating current generator, namely windings 14 and 15, are short circuited substantially without interruption so that only a voltage of approximately 1 volt is developed across them and no current is allowed to flow to the DC load circuit connected to lines 18 and 19. Diodes 16 and 17 prevent a short circuiting of the battery over thyristors 32 and 33. Since the battery is now no longer being charged, the voltage at its terminals will gradually decrease causing the base current of transistor 28 to be reduced and its collector potential to become negative. This change of potential is transferred to point 47 via resistor 53 so that transistor 27 becomes fully blocked in turn blocking transistor 28. Thus the current to the gates of thyristors 32 is blocked and the thyristors also become blocked as soon as the voltage at the last conducting thyristor becomes negative. Generator 11 then again furnishes current to battery 22 via rectifiers 16 and 17 so that the voltage at the battery again rises and the above cycle repeats. During operation, transistor 28 may be switched several hundred times a second, depending upon the operating conditions of generator 11 with respect to speed and load.

In practice, battery 22 is often disconnected in small equipment in order that other equipment may be started. When the battery is removed, the voltage at the battery terminals can rise very rapidly, especially if the generator is being driven at high speed. Voltage peaks may reach a high of 200 volts. This voltage not only endangers the semiconductor elements in the regulating circuit, but also present a danger for the operator who removes and replaces the battery. In particular, as mentioned above, this voltage presents a danger because the operator does not expect such a high voltage. When the voltage changes occur vary rapidly, the above-described regulating arrangement cannot immediately limit the output voltage since a determined time delay is introduced by capacitor 50.

Use of the Zener diode 39 results in a safe limitation of voltage even under these conditions. As soon as the voltage between lines 18 and 19 exceeds a value as for example 25 volts, Zener diode 39 becomes conductive so that a control current flows to thyristors 32 and 33 causing that thyristor to become conductive whose anode is at that moment positive. Since the thyristors switch with extremely short time delay, it is possible to limit the voltage between lines 18 and 19 to a safe value substantially instantaneously.

It is obvious that the illustrated construction of the circuit is particularly simple. This is achieved in part by the fact that transistors 27 and 28 are of opposite types, that is, one is an NPN-transistor while the other is a PNP-transistor. It is further achieved by the control circuit used for thyristors 32 and 33, namely the first and second voltage dividers and also by the good use made of the close magnetic coupling between output windings 14 and 15 of generator 11. Even the common connection of the cathodes of both thyristors to ground, leads to a particularly simple circuit. Because of the mode of operation of the switching transistor, thyristors 32 and 33 are always either fully conductive or totally blocked, that is, these thyristors are operated under optimal conditions.

While the invention has been illustrated and described as embodied in particular types of switching elements and a particular type of control means, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Voltage regulator arrangement for regulating the load voltage across a direct current load, comprising, in combination, alternating current generating means having a first output winding, and a second output winding magnetically coupled to said first output winding; rectifier means interconnecting said first and second output windings and said direct current load; first and second switching means, having a first and second control electrode respectively and adapted to have a unidirectional conducting state in response to control signals applied to said control electrodes; means connecting said first switching means across said first output winding; means connecting said switching means across said second output winding in such a manner that a substantially continuous short circuit exists across said magnetically coupled output windings in response to control signals at said first and second control electrodes; and control circuit means connected between said direct current load and said control electrodes, said control circuit means comprising: a control circuit output terminal; control switching transistor means having an emitter-collector circuit interconnected between one side of said direct current load and said control circuit output terminal for changing the voltage at said control circuit output terminal from a first to a second level when said load voltage exceeds a predetermined voltage; interconnecting means interconnecting said control circuit output terminal and said first and second control electrode in such a manner that said second level constitutes said first and second control signals; and an additional control element having a predetermined voltage breakdown characteristic connected in parallel with said emitter-collector circuit of said control switching transistor.

2. A voltage regulator arrangement as set forth in claim 1, wherein said alternating current generating means comprise a permanent magnet generator.

3. A voltage regulator arrangement as set forth in claim 2, wherein said first and second switching means respectively comprise a first and second thyristor.

4. A voltage regulator arrangement as set forth in claim 1, wherein said control switching transistor has a base; and wherein said control circuit means further comprise an amplifier transistor having an amplifier transistor output circuit connected to said base of said switching transistor and an amplifier transistor input circuit; further comprising positive feedback means connected between said control circuit output terminal and said amplifier transistor input circuit.

5. A voltage regulator arrangement as set forth in claim 4, wherein said positive feedback means comprise a resistor.

6. A voltage regulator arrangement as set forth in claim 5, wherein said control switching transistor is a PNP-transistor; and wherein said amplifier transistor is an NPN-transistor.

7. A voltage regulator arrangement as set forth in claim 6, wherein said alternating current generating means comprise a single-phase generator; wherein said single-phase generator has a first and second output winding connected at a common point; wherein said first and second thyristors are connected, respectively, across said first and second output winding, corresponding electrodes of said thyristors being connected to said common point.

8. A voltage regulator arrangement as set forth in claim 1, wherein said additional control element comprises Zener diode.

9. A voltage regulator arrangement as set forth in claim 1, wherein said interconnecting means interconnecting said control circuit output terminal and said first and second control electrodes comprise first and second voltage divider means having, respectively, a first and second voltage tap respectively connected to said first and second control electrodes.

* * * * *